(12) United States Patent
Mao et al.

(10) Patent No.: US 9,028,958 B2
(45) Date of Patent: May 12, 2015

(54) SUPERHYDROPHILIC NANOSTRUCTURE

(75) Inventors: Samuel S. Mao, Castro Valley, CA (US); Vasileia Zormpa, Berkeley, CA (US); Xiaobo Chen, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 821 days.

(21) Appl. No.: 13/265,377

(22) PCT Filed: May 6, 2010

(86) PCT No.: PCT/US2010/033927
§ 371 (c)(1),
(2), (4) Date: Feb. 2, 2012

(87) PCT Pub. No.: WO2010/129807
PCT Pub. Date: Nov. 11, 2010

(65) Prior Publication Data
US 2012/0128963 A1 May 24, 2012

Related U.S. Application Data

(60) Provisional application No. 61/176,864, filed on May 8, 2009.

(51) Int. Cl.
*C03C 17/00* (2006.01)
*B82Y 30/00* (2011.01)
*C01G 23/047* (2006.01)

(52) U.S. Cl.
CPC ............... *C03C 17/007* (2013.01); *B82Y 30/00* (2013.01); *C01G 23/047* (2013.01); *C01P 2002/52* (2013.01); *C01P 2004/04* (2013.01); *C01P 2004/64* (2013.01); *C01P 2006/60* (2013.01); *C03C 2217/425* (2013.01); *C03C 2217/75* (2013.01)

(58) Field of Classification Search
None
See application file for complete search history.

(56) References Cited

U.S. PATENT DOCUMENTS

| | | | |
|---|---|---|---|
| 3,865,619 A | 2/1975 | Pennewiss et al. | |
| 3,933,407 A | 1/1976 | Tu et al. | |
| 4,127,682 A | 11/1978 | Laurin | |
| 4,467,073 A | 8/1984 | Creasy | |
| 4,478,909 A | 10/1984 | Taniguchi et al. | |
| 5,075,133 A | 12/1991 | Hosono et al. | |
| 5,244,935 A | 9/1993 | Oshibe et al. | |
| 5,334,310 A | 8/1994 | Frechet et al. | |
| 5,453,185 A | 9/1995 | Frechet et al. | |
| 5,728,457 A | 3/1998 | Frechet et al. | |
| 5,804,612 A | 9/1998 | Song et al. | |
| 5,853,896 A | 12/1998 | Kondo et al. | |
| 5,929,214 A | 7/1999 | Peters et al. | |
| 6,455,142 B1 | 9/2002 | Heberger et al. | |
| 6,616,825 B1 | 9/2003 | Frechet et al. | |
| 6,887,384 B1 | 5/2005 | Frechet et al. | |
| 7,431,888 B2 | 10/2008 | Frechet et al. | |
| 2002/0016433 A1 | 2/2002 | Keller et al. | |
| 2003/0075011 A1* | 4/2003 | Rosen et al. | 75/228 |
| 2004/0101442 A1 | 5/2004 | Frechet et al. | |
| 2006/0068447 A1 | 3/2006 | Banerjee et al. | |
| 2006/0292345 A1 | 12/2006 | Dave et al. | |
| 2007/0005024 A1* | 1/2007 | Weber et al. | 604/265 |
| 2008/0248263 A1 | 10/2008 | Kobrin | |
| 2011/0033663 A1 | 2/2011 | Svec et al. | |
| 2012/0010068 A1* | 1/2012 | Zhao et al. | 502/1 |

FOREIGN PATENT DOCUMENTS

| | | |
|---|---|---|
| EP | 1544269 | 6/2005 |
| WO | 2008/021817 | 2/2008 |
| WO | WO2009/062248 | * 5/2009 |
| WO | 2009/137267 | 11/2009 |

OTHER PUBLICATIONS

CN patent application No. 201080031197.5, Office Action mailed Sep. 22, 2013.
CN patent publication No. 1681077, "Preparation of nano-junction," Oct. 12, 2005, English abstract.
Song, Kang Yong et al., "Preparation of transparent particulate $MoO_3$/$TiO_2$ and $WO_3/TiO_2$ films and their photocatalytic properties," Chem. Mater., 2001, 13 (7), pp. 2349-2355, abstract.
U.S. Appl. No. 12/988,497, Office Action mailed May 7, 2013.
U.S. Appl. No. 12/988,497, Office Action mailed Oct. 3, 2013.
WO patent application No. PCT/US2009/041277, International Search and Written Opinion mailed Jan. 11, 2010.
Xie, Shaofeng et al., "Porous polymer monoliths: an alternative to classical beads", Advances in Biochemical Engineering/Biotechnology, vol. 76, 2002.
Svec, Frantisek et al., "Monolithic materials: promises, challenges, achievements", Analytical Chemistry, pp. 2101-2107, Apr. 1, 2006.
Svec, Frantisek et al., "New designs of macroporous polymers and supports: from separation to biocatalysis", Science, The American Association for the Advancement of Science, Print Series, vol. 273, pp. 205-211, Jul. 1996.
Ma, Ying et al., "Fabrication of super-hydrophobic film from PMMA with intrinsic water contact angle below 90°", ScienceDirect, Polymer 48 (2007) 7455-7460, Oct. 30, 2007.

(Continued)

*Primary Examiner* — Sheeba Ahmed
(74) *Attorney, Agent, or Firm* — Lawrence Berkeley National Laboratory

(57) ABSTRACT

An embodiment of a superhydrophilic nanostructure includes nanoparticles. The nanoparticles are formed into porous clusters. The porous clusters are formed into aggregate clusters. An embodiment of an article of manufacture includes the superhydrophilic nanostructure on a substrate. An embodiment of a method of fabricating a superhydrophilic nanostructure includes applying a solution that includes nanoparticles to a substrate. The substrate is heated to form aggregate clusters of porous clusters of the nanoparticles.

19 Claims, 6 Drawing Sheets

(56) References Cited

OTHER PUBLICATIONS

Roach, Paul et al., "Progess in superhydrophobic surface development", Soft Matter, 2008, 4, pp. 224-240, The Royal Society of Chemistry 2008, Oct. 30, 2007.
Lee, Hoon Joo et al., Preparation of a superhydrophobic rough surface, Journal of Polymer Science: Part B: Polymer Physics, vol. 45, 253-261 (2007), Oct. 12, 2006.
Scheler, Stefan, "A novel approach to the interpretation and prediction of solvent effects in the synthesis of macroporous polymers", Wiley6 InterScience, Journal of Applied Polymer Science, vol. 105, 3121-3131 (2007), May 23, 2007.
Tadanaga, Kiyoharu et al., "Formation of superhydrophobic alumina coating films with high transparency on polymer substrates by the sol-gel method", Journal of Sol-Gel Science and Technology, 26, 705-708, 2003.
Tadanaga, Kiyoharu et al., "Formation of superhydrophobic-superhydrophilic pattern on flowerlike alumina thin film by the sol-gel method", Journal of Sol-Gel Science and Technology, 19, 211-214, 2000.
Sun, Taolei et al., "Bioinspired surfaces with special wettability", American Chemical Society, Accounts of Chemical Research, vol. 38, No. 8, 2005, pp. 644-652, May 19, 2005.
Rohr, Thomas et al., "Photografting and the control of surface chemistry in three-dimensional porous polymer monoliths", Macromolecules 2003, 36, 1677-1684, American Chemical Society, Feb. 1, 2003.
Ranby, B. et al., "Surface photografting of polymer fibers, films and sheets", Nuclear Instruments and Methods in Physics Research B 151 (1999) 301-305.
Ranby, Bengt et al., "Surface modification of polymers by photoinitiated graft polymerizastion", Makromol. Chem., Macromol. Symp. 63, 55-67 (1992).
Premstaller, Andreas et al., "High-performance liquid chromatography-electrospray ionization mass spectrometry of single- and double-stranded nucleic acids using monolithic capillary columns", Analytical Chemistry, vol. 72, No. 18, Sep. 15, 2000.
Pastine, Stefan J. et al., "A facile and patternable method for the surface modification of carbon nanotube forests using perfluoroarylazides", American Chemical Society, J. Am. Chem. Soc. 2008, 130, 4238-4239, Jan. 15, 2008.
Liu, Huan et al., "Reversible wettability of a chemical vapor deposition prepared ZnO film between superhydrophobicity and superhydrophilicity", American Chemical Society, Langmuir 2004, 20, 5659-5661, Jun. 2, 2004.
Li, Xue-Mei et al., "What do we need for a superhydrophobic surface? A review on the recent progress in the preparation of superhydrophobic surfaces", The Royal Society of Chemistry, Chem. Soc. Rev., 2007, 36, 1350-1368, Jan. 31, 2007.
Lam, Philippe et al., "Surface-tension-confined microfluidics", American Chemical Society, Langmuir 2002, 18, 948-951, Jan. 10, 2002.
Holdsvendova, Petra et al., "Methacrylate monolithic columns for capillary liquid chromatography polymerizsed using ammonium peroxodisulfate as initiator", J. Sep. Sci. 2003, 26, 1623-1628, Jun. 25, 2003.
Gau, Hartmut et al., "Liquid morphologies on structured surfaces: from microchannels to microchips", Science, vol. 283, Jan. 1, 1999.
Garrod, R.P. et al., "Mimicking a stenocara beetle's back for microcondensation using plasmachemical patterned superhydrophobic—superhydrophilic surfaces", American Chemical Society, Langmuir 2007, 23, 689-693, Dec. 8, 2006.
Gao, Lichao et al., "How Wenzel and Cassie were wrong", American Chemical Society, Langmuir 2007, 23, 3762-3765, Feb. 22, 2007.
Feng, Xinjian et al., "Design and creation of superwetting / antiwetting surfaces", Advanced Materials 2006, 18, 3063-3078.
Eeltink, Sebastiaan et al., "Optimization of the porous structure and polarity of polymethacrylate-based monolithic capillary columns for the LC-MS separation of enzymatic digests", J. Sep. Sci. 2007, 30, 2814-2820, Jun. 1, 2007.

Cassie, A.B.D. et al., "Wettability of porous surfaces", Trans. Faraday Soc., 40, 546-551 (1944) Jan. 1, 1944.
Bravo, Javier et al., "Transparent superhydrophobic films based on silica nanoparticles", American Chemical Society, Langmuir 2007, 23, 7293-7298, May 25, 2007.
Blossey, Ralf, "Self-cleaning surfaces—virtual realities", Nature Materials, vol. 2, May 2003.
Barthlott, W. et al., "Purity of the sacred lotus, or escape from contamination in biological surfaces", Planta (1997) 202: 1-8, Nov. 12, 1996.
Zhao, Bin et al., "Surface-directed liquid flow inside microchannels", Science, vol. 291, 1023-1026, Feb. 9, 2001.
Zhang, Xi et al., "Superhydrophobic surfaces: from structural control to functional application", The Royal Society of Chemistry, J. Mater. Chem., 2008, 18, 621-633, Nov. 14, 2007.
Zhang, Xintong et al., "A transparent and photo-patternable superhydrophobic film", The Royal Society of Chemistry, Chem. Commun., 2007, 4949-4951, Oct. 30, 2007.
Zhang, Jilin et al., "A composite polymer film with both superhydrophobicity and superoleophilicity", Macromol. Rapid Commun. 2006, 27, 804-808, Mar. 14, 2006.
Zhai, Lei et al., "Patterned superhydrophobic surfaces: toward a synthetic mimic of the namib desert beetle", American Chemical Society, Nano Letters 2006, vol. 6, No. 6, 1213-1217, May 2, 2006.
Yu, Cong et al., "Towards stationary phases for chromatography on a microchip: molded porous polymer monoliths prepared in capillaries by photoinitiated in situ polymerization as separation media for electrochromatography", Electrophoresis 2000, 21, 120-127.
Yabu, Hiroshi et al., "Single-step fabrication of transparent superhydrophobic porous polymer films", American Chemical Society, Chem. Mater. 2005, 17, 5231-5234, Sep. 27, 2005.
Wang, Q. Ching et al., "Macroporous polymeric stationary-phase rod as continuous separation medium for reversed-phase chromatography", American Chemical Society, Anal. Chem. 1993, 65, 2243-2248.
Viklund, Camilla et al., "Synthesis of porous zwitterionic sulfobetaine monoliths and characterization of their interaction with proteins", American Chemical Society, Macromolecules 2000, 33, 2539-2544, Mar. 11, 2000.
Tuteja, Anish et al., "Designing superoleophobic surfaces", Science, vol. 318, 1618-1622, Dec. 7, 2007.
Tripp, Jennifer A. et al., "Grafted macroporous polymer monolithic disks: a new format of scavengers for solution-phase combinatorial chemistry", American Chemical Society, J. Comb. Chem. 2001, 3, 216-223, Jan. 19, 2001.
Chen, Xiaobo et al., "Titanium dioxide nanomaterials: systhesis, properties, modifications, and applications," Chem. Rev. 2007, 107 (7), 2891-2959.
Gan, Wee Yong et al., "Novel $TiO_2$ thin film with non-UV activated superwetting and antifogging behaviours," Journal of Materials Chemistry 17 (2007) 952-954.
Gu, Zhong-Ze et al., "Biomimetic titanium dioxide film with structural color and extremely stable hydrophilicity," Applied Physics Letters 85 No. 21(2004) 5067.
Guo, Chaowei et al., "Large-area fabrication of a nanostructure-induced hydrophobic surface from a hydrophilic polymer," Chemphyschem 5 (2004) 750.
Lee, Daeyeon et al., "All-nanoparticle thin-film coatings," Nano Letters 2006, vol. 6, No. 10, 2305-2312.
McHale, G. et al., "Topography driven spreading," Physical Reciew Letters, vol. 93, No. 3, 036102-1, Jul. 16, 2004.
Mosaddeq-ur-Rahman, M. et al., "Refractive index and degree of inhomogeneity of nanocrystalline $TiO_2$ thin films: effects of substrate and annealing temperature," Journal of Applied Physics 88, (2000) 4634.
Pan, Chao et al., "Bio-inspired titanium dioxide film with extremely stable superamphilicity," Materials Research Bulletin 42 (2007) 1395-1401.
Parkin, Ivan P. et al., "Self-cleaning coatings," Journal of Materials Chemistry 15 (2005) 1689-1695.
Song, Shu et al., "Superhydrophilic anatase $TiO_2$ film with the micro- and nanometer-scale hierarchical surface structure," Materials Letters 62 (2008) 3503-3505.

(56) References Cited

OTHER PUBLICATIONS

Stevens, N. et al., "Wettability of photoresponsive titanium dioxide surfaces," Langmuir 2003, 19, 3272-3275.

Wang, Rong et al., "Photogeneration of highly amphiphilic $TiO_2$ surfaces," Advanced Materials 1998, 10, No. 2, 135-138.

Wang, Rong et al., "Light-induced amphiphilic surfaces," Nature, vol. 388, Jul. 31, 1997, 431-432.

Wenzel, Robert N., "Resistance of solid surfaces to wetting by water," Industrial and Engineering Chemistry 28 (1936) 988-994.

Zhai, Lei et al., "Stabel superhydrophobic coatings from polyelectrolyte multilayers," Nano Letters, 2004 vol. 4 (7) 1349-1353.

V. Zorba et al., "Superhydrophilic TiO2 surface without photocatalytic activation." Applied Physics Letters 96, 093702 (2010).

I. Horcas et al., "WSXM: A software for scanning probe microscopy and a tool for nanotechnology." Rev. Sci. Instrum. 78, 013705 (2007).

Aegerter et al., "Coatings made by sol-gel and chemical nanotechnology." Journal of Sol-Gel Science and Technology. vol. 47. pp. 203-23605; Jun. 5, 2008.

Hegde et al., "Two step sol-gel processing of TEOS based hydrophobic silica aerogels using trimethylethoxysilane as a co-precursor." Journal of Porous Materials. vol. 14. pp. 165-171; Jan. 26, 2007.

\* cited by examiner

SUPERHYDROPHILIC NANOSTRUCTURE

RELATED APPLICATIONS

The application claims priority to U.S. Provisional Patent Application Ser. No. 61/176,864, filed May 8, 2009, which is herein incorporated by reference in its entirety.

STATEMENT OF GOVERNMENT SUPPORT

This invention was made with government support under Contract No. DE-AC02-05CH11231 awarded by the U.S. Department of Energy. The government has certain rights in this invention.

BACKGROUND OF THE INVENTION

The present invention relates to the field of surface science and, more particularly, to the field of surface science where there is a desire to improve a hydrophilic behavior of a surface.

Fogging frequently occurs when a cold surface suddenly comes in contact with warm, moist air. Fogging scatters light and often renders the surface translucent. Fogging severity can ultimately compromise the usefulness of the transparent material and can be a dangerous condition, for example when the fogged material is a vehicle windscreen or goggle lens.

As an example, fogging of spectacle lenses made of glass or plastic occurs when water vapor in the air condenses because of the difference between the temperatures of the air and the spectacle lenses, with the result that tiny water droplets adhere to the surfaces of the spectacle lenses and irregularly reflect or refract light in a complex manner. To prevent the occurrence of such fogging, it is known to coat the surfaces of the spectacle lenses with an anti-fogging liquid such as a hydrophilic activator so that the surface tension is decreased and the generation of water droplets is thereby avoided. However, this technique suffers from a problem in that the coated anti-fogging liquid cannot remain effective for a long period of time because it evaporates or is wiped off.

Current commodity anti-fog coatings often lose effectiveness after repeated cleanings over time, and therefore require constant reapplication to ensure their effectiveness. Numerous compositions have been proposed for anti-fog applications. For example, in U.S. Pat. No. 6,455,142 entitled, "Anti-fog coating and coated film," Heberger et al. teach a coated polymer film that is applied to a surface and that provides an essentially streak free coated surface. Another example is U.S. Pat. No. 5,853,896 entitled, "Water repellant agent for glass," in which Kondo et al. teach a water repellant composition for application to glass (e.g., glass windshields) where such a composition is a mixture of an organosilane and a diorganopolysiloxane. Yet another example is U.S. Pat. No. 5,804,612 entitled, "Transparent anti-fog coating," in which Song et al. teach a transparent coating that includes a polymer, an aluminum containing crosslinker, and a surface active agent containing hydroxyl or siloxane groups.

In certain applications, such as dental mirrors, where accurate reflection of a patient's dental details is of paramount importance, and where non-toxicity is imperative, such compositions are not completely satisfactory. Nor due they provide a total solution to the anti-fogging problem. Some require lengthy curing. Some are toxic. Many will immediately dissolve and wash off from a dental mirror in the water generated by high speed drills in current use. And none provide adequate visibility for viewing details in the operative field: the proximity of a dental mirror to the tooth diffuses the reflection and obscures tooth details necessary for precise dental work.

More generally, surfaces that strongly attract (super-hydrophilic) or repel (super-hydrophobic) water are key to the two basic routes to self-cleaning, through film or droplet flow, respectively (see, R. Blossey, Nature Materials 2 (2003) 301). While theories established in the early 20th century (see, A. B. D. Cassie et al., Transactions of the Faraday Society 40 (1944) 0546; and R. N. Wenzel, Industrial and Engineering Chemistry 28 (1936) 988) were able to relate the wetting phenomena to general surface properties, the role of surface structures has been revisited recently after studies of a number of biological systems, e.g., lotus leaf (Nelumbo Nucifera), Colocasia esculenta, and Namib desert beetle (see, W. Barthlott et al., Planta 202 (1997) 1), revealed the significance of complex hierarchical microstructures to realizing extreme wetting surfaces. These studies prompted a new strategy for self-cleaning technologies based on mimicking the morphology of biological surfaces (see, L. Zhai et al., Nano Letters 4 (2004) 1349), although the primarily goal has been to achieve super-hydrophobicity.

In the meantime, $TiO_2$ has received much recent attention as a unique photocatalyst with exciting potential for many energy and environmental applications crossing traditional disciplinary boundaries (see, e.g., X. Chen, S. S. Mao, Chemical Reviews 107 (2007) 2891). Since the discovery of UV light induced photocatalytic activity that can enhance its surface wettability (see, R. Wang et al., Nature 388 (1997) 431; and R. Wang et al., Advanced Materials 10 (1998) 135), $TiO_2$ has been extensively used in self-cleaning and related anti-pollution, anti-bacteria applications (see, I. P. Parkin et al., Journal of Materials Chemistry 15 (2005) 1689). However, a critical challenge of $TiO_2$-based techniques originates from the difficulty of sustaining the wetting behavior, though many drastic steps have been taken to overcome this challenge using, for instance, non-transparent (see, C. Pan et al., Materials Research Bulletin 42 (2007) 1395; and Z. Z. Gu et al., Applied Physics Letters 85 (2004) 5067) or composite systems (see, D. Lee et al., Nano Letters 6 (2006) 2305). Recent attempts of a multilayer assembly of $TiO_2$ nanoparticles and polyethylene glycol (see, W. Y. Gan et al., Journal of Materials Chemistry 17 (2007) 952; and S. Song et al., Materials Letters 62 (2008) 3503) showed a short-lived super-hydrophilic surface without the use of UV irradiation, for which the extreme wetting behavior collapsed after exposure to a moderate temperature. From the point of view of applications, achieving super-hydrophilic surfaces from $TiO_2$ while circumventing the need of external stimuli is regarded as the ultimate self-cleaning technology, in particular if the extreme wetting property could be combined with additional functionalities (see, C. W. Guo et al., Chemphyschem 5 (2004) 750) such as optical transparency. In fact, incorporating $TiO_2$ on traditional transparent substrates (e.g. glass) for low reflectance, high transmittance applications has often been challenging.

SUMMARY OF THE INVENTION

Embodiments of the present invention include a suprehydrophilic nanostructure, an article of manufacture, and a method of fabricating a suprehydrophilic nanostructure. An embodiment of a superhydrophilic nanostructure of the present invention includes nanoparticles. The nanoparticles are formed into porous clusters. The porous clusters are formed into aggregate clusters. An embodiment of an article of manufacture of the present invention includes the superhydrophilic nanostrucutre on a substrate. An embodiment of a method of fabricating a superhydrophilic nanostructure of the present invention includes applying a solution that includes nanoparticles to a substrate. The substrate is heated to form aggregate clusters of porous clusters of the nanoparticles.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Embodiments of the present invention include a superhydrophilic nanostructure, an article of manufacture, and a method of fabricating a superhydrophilic nanostructure.

Figure 1:
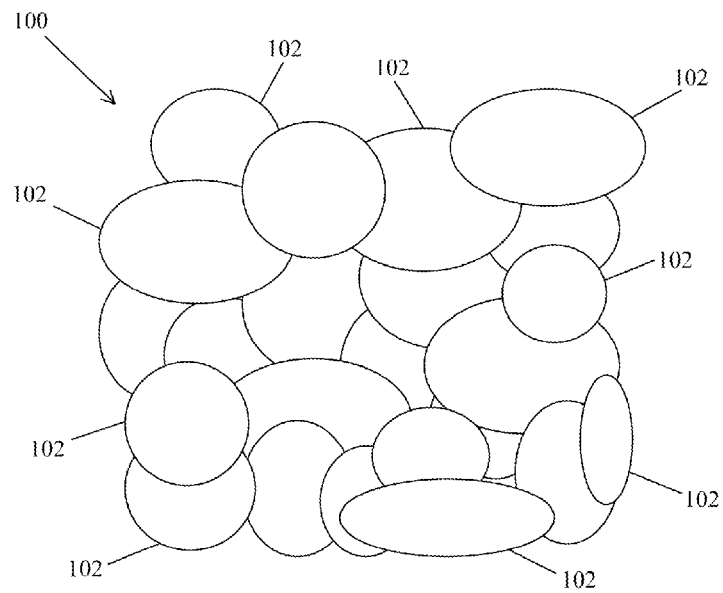
FIG. 1 illustrates an embodiment of a nanostructure of the present invention yielding superhydrophilicity.

FIG. 1 illustrates a top view of an embodiment of a superhydrophilic nanostructure 100 of the present invention. The superhydrophilic nanostructure 100 includes a plurality of aggregate clusters 102. Each aggregate cluster 102 includes a plurality of porous clusters (not shown). Each porous cluster includes a plurality of nanoparticles (not shown). Shapes of the aggregate cluster when viewed from above as illustrated in FIG. 1 may be round, oblong, rod-shaped, spindle-shaped, or other suitable shapes. The superhydrophilic nanostructure 100 may include a mixture of such shapes. According to embodiments, dimensions of the aggregate clusters 102 may be within the range of about 150 nm to 5 μm. According to other embodiments, dimensions of the aggregate clusters 102 may be within the range of about 200 nm to 5 μm.

Figure 2:
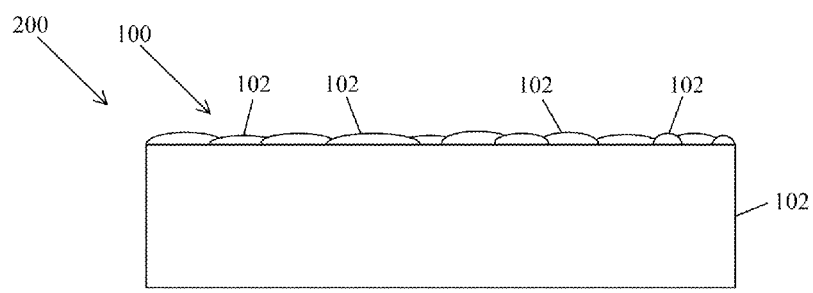
FIG. 2 illustrates a superhydrophilic nanostructure on a substrate in accordance with an embodiment of the present invention.

FIG. 2 illustrates a side view of an embodiment of an article of manufacture 200. The article of manufacture 200 includes the superhydrophilic nanostructure 100 on a substrate 204. The superhydrophilic nanostructure 100 includes the plurality of aggregate clusters 102. According to embodiments, a height of the aggregate clusters 102 may vary within the range of about 150 nm to 5 μm. According to other embodiments, a height of the aggregate clusters 102 may vary within the range of about 200 nm to 5 μm.

It will be readily apparent to one skilled in the art that the substrate 204 may be a layered substrate in which layers reside on between a base substrate and the superhydrophilic nanostructure 100.

Figure 3:
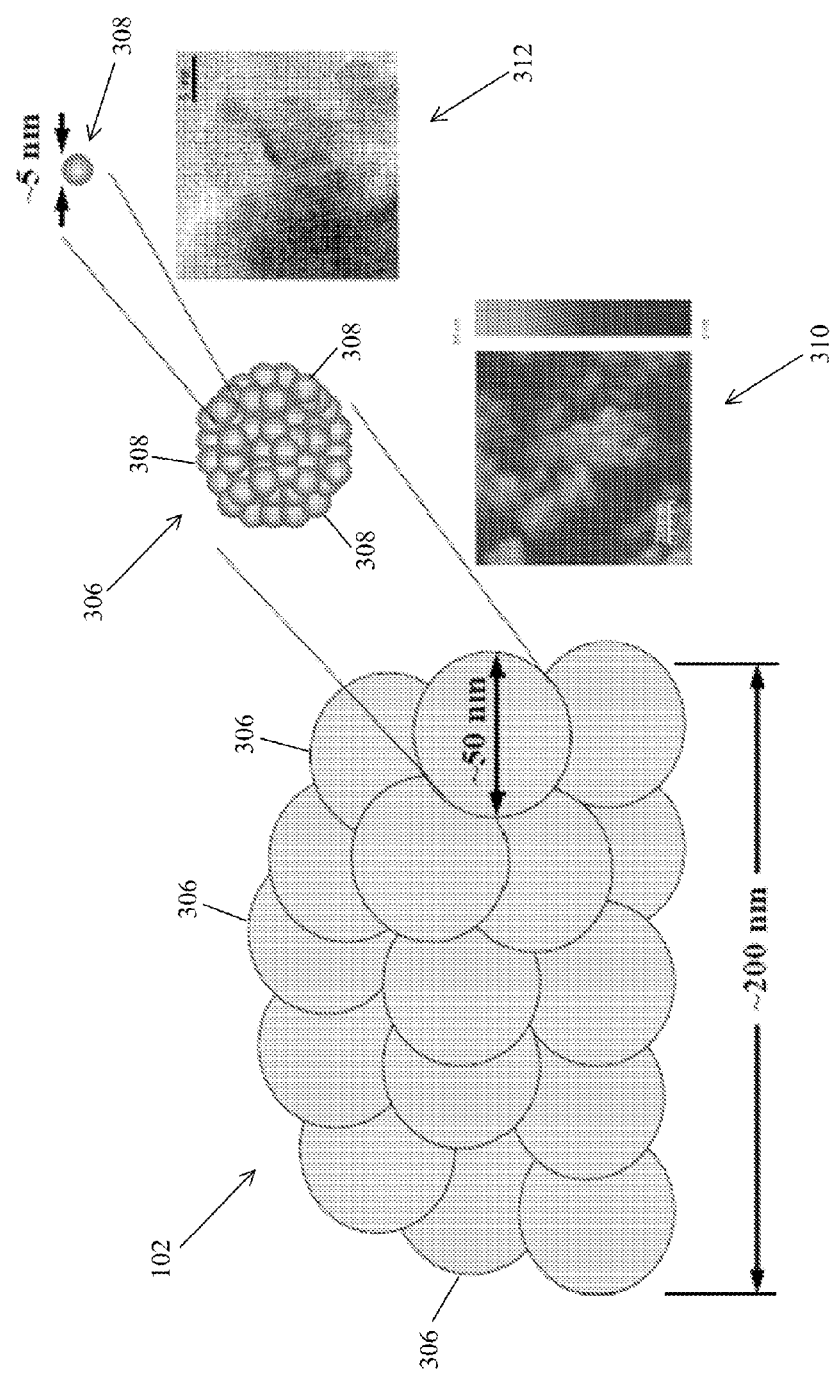
FIG. 3 illustrates embodiments of an aggregate cluster, porous clusters, and nanoparticles in accordance of the present invention and also provides an AFM image of example of aggregate clusters of the present invention and a TEM image of example nanoparticles of the present invention.

FIG. 3 illustrates a side view of an embodiment of a single aggregate cluster 102 of the present invention. The aggregate cluster includes a plurality of porous clusters 306. The porous clusters 306 may be spherically shaped, as illustrated in FIG. 3, or may have other shapes including a mixture of shapes. For example, shapes of the porous clusters 306 may be oblong, rod-shaped, spindle-shaped, or other suitable shapes. According to embodiments, dimensions of the porous clusters 306 may be within the range of 20 to 600 nm. According to other embodiments, dimensions of the porous clusters 306 may be within the range of about 50 to 600 nm.

A single porous cluster 306 is illustrated to the right of the aggregate cluster 102. The porous cluster 306 includes a plurality of nanoparticles 308. A single nanoparticle 308 is illustrated to the above left from the porous cluster 306. While shapes of the nanoparticles 308 are illustrated in FIG. 3 as spherical or quantum dot shaped, the nanoparticles 308 may have other shapes including a mixture of shapes. For example, the nanoparticles 308 may be nanorods, nanospindles, nanosheets, nanowires, nanodisks, branched nanoparticles, or other suitable nanoparticles. According to embodiments, dimensions of the nanoparticles 308 may be within the range of about 1 to 100 nm. According to other embodiments, dimensions of the nanoparticles 308 may be within the range of about 1 to 50 nm. Typical dimensions for the aggregate cluster 102, the porous clusters 306, and the nanoparticles 308 are indicated in FIG. 3 as 200 nm, 50 nm, and 5 nm, respectively.

According to an embodiment, the nanoparticles 308 include $TiO_2$ nanoparticles. Such $TiO_2$ nanoparticles may include a dopant or dopants such as an H, N, S, C, or B dopant or a combination of such dopants.

Applications of the superhydrophilic nanostructure 100 of the present invention include use of the superhydrophilic nanostructure 100 as self-cleaning coatings or anti-fogging coatings. Such anti-fogging coatings can be used in any setting where the condensation of water droplets on a surface is undesired, particularly where the surface is transparent. Examples of such settings include sport goggles, auto windshields, windows in public transit vehicles, windows in armored cars for law enforcement and VIP protection, solar panels, green-house enclosures, sun-wind-dust goggles, laser safety eye protective spectacles, chemical/biological protective face masks, ballistic shields for explosive ordnance disposal personnel, and vision blocks for light tactical vehicles. Further, additional applications of the present invention include spectacle lenses, cameras, lenses for various types of optical devices, dental mirrors, and windowpanes.

More generally, applications of the superhydrophilic nanostructure 100 of the present invention include self-cleaning for pollution control, self-cleaning or anti-fogging windows, self-cleaning or anti-fogging medical applications (e.g., dental mirrors), self-cleaning or anti-fogging flexible plastic film. An example of the latter is a flexible plastic film used for wrapping foods on display in a market. Because such a plastic film precludes formation of water droplets or fog on its surface, customers can see through the plastic film and easily view the product (e.g., a refrigerated or frozen food item).

An embodiment of a method of fabricating a superhydrophilic nanostructure of the present invention includes providing a solution that includes nanoparticles. The solution is applied to a substrate. The substrate is then heated to form aggregate clusters of porous clusters of the nanoparticles. In an embodiment, applying the solution to substrate includes spin casting the solution onto the substrate. Embodiments of heating of the substrate following application of the solution to the substrate include heating the substrate in an oven or furnace that has a temperature within the range of about 50 to 600° C. for a period of time within the range of about 5 minutes to 12 hours. Other embodiments of heating of the substrate include heating the substrate in an oven or furnace that has a temperature within the range of 200 to 600° C. for a period of time within the range of about 1 to 12 hours. In yet another embodiment, the substrate is heated in an over or furnace with a temperature of about 500° C. for about 5 hours. Heating of the substrate may be referred to as a calcination technique since heating of the substrate forms the porous clusters of nanoparticles into the aggregate clusters. That is, the superhydrophilic nanostructure of the present invention is formed in the heating or calcination step.

An embodiment of the method of fabricating the superhydrophilic nanostructure further includes forming the nanoparticles. In an embodiment, the nanoparticles are formed using an electrochemistry technique. Such a technique includes placing a pair of electrodes in an ionic solution and applying a voltage across the electrodes. This creates an ionic channel in the solution, which oxidizes the metal of the salt to form the porous clusters of the nanoparticles. In embodiments, first and second electrodes may be chosen from the pairs of Pt and Ti, Pt and Fe, Fe and Fe, Fe and Ti, and Ti and Ti electrode pairs. According to embodiments, the ionic salt solution is an aqueous solution that includes NaCl, NaF, KCl, KF, or another suitable salt. In an alternative embodiment, the porous clusters of the nanoparticles are formed using another solution chemistry approach such as a sol-gel approach.

An alternative embodiment of fabricating the superhydrophilic nanostructure of the present invention employs a physical vapor deposition technique (e.g., a laser ablation technique). Such a technique includes placing a prefabricated $TiO_2$ solid target material in a chamber, which may be maintained in vacuum or filled with gases, such as $O_2$, $N_2$, Ar, with pressure up to the atmospheric pressure. This target material is vaporized by an energetic beam, such as a laser beam, an electron beam, or an ion beam, the vaporized target material is deposited onto a substrate, such as a glass or a plastic sheet, forming a porous network of $TiO_2$ nanoclusters.

Since the discovery of extreme surface wetting phenomenon induced by ultraviolet (UV) photocatalysis, $TiO_2$ has become the material of choice for environmentally friendly applications such as self-cleaning and anti-contamination coatings. Nevertheless, it remains a significant challenge to realize surfaces exhibiting persistent super-hydrophilicity but without the need of external stimuli, especially UV irradiation that also degrades the wetting surface over a period of time. The present invention is a porous $TiO_2$ nanostructure that shows extreme super-hydrophilicity without the need of light activation, and with stability against successive wetting-dewetting cycles. Additionally, this ultimate $TiO_2$ wetting surface exhibits high optical transmittance over a wavelength range from near UV to the infrared, thus enabling practical anti-fogging technologies where transparency is equally critical.

In view of the importance of surface microstructures on the extreme wetting property as reflected by many biological systems, a hierarchical porous $TiO_2$ surface was designed and deposited on glass substrates. The hierarchical porous $TiO_2$ surface possesses a self-similar morphology with roughness at three different length scales—a macroscopic roughness in the range of a few hundred nanometers and greater (i.e. the aggregate clusters 102 of FIGS. 1, 2 and 3), a secondary feature with dimensions of tens of nanometers to hundreds of nanometers (i.e. the porous clusters 306 of FIG. 3), and individual $TiO_2$ nanoparticles with a diameter of a few nanometers (i.e. the nanoparticles 308 of FIG. 3). It has been demonstrated that the intrinsic hydrophilic property of $TiO_2$ combined with a hierarchical porous structure provided much desired extreme wetting behavior. In FIG. 3, a first inset 310 provides an AFM (atomic force microscopy) image of an example of an aggregate cluster and adjacent aggregate clusters. Spherical shaped objects in this image are porous clusters. In FIG. 3, a second inset 312 provides a TEM (transmission electron microscopy) image of example nanoparticles of a porous cluster.

Figures 4A, 4B:
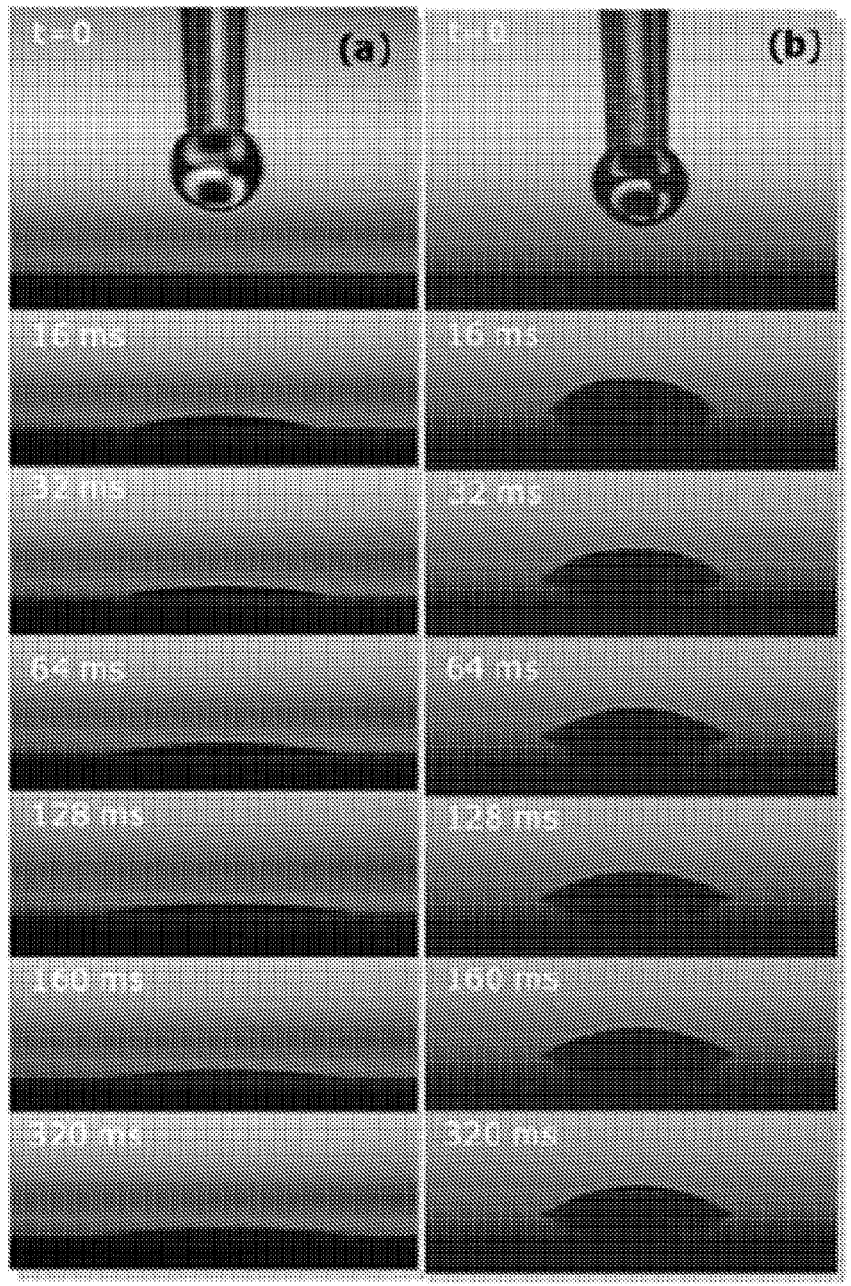
FIGS. 4A and 4B provide time sequence photos of liquid spreading on an example treated surface of the present invention and on an untreated surface, respectively.

The initial spreading stages of a water droplet on a glass coated with the self-similar porous $TiO_2$ and on an untreated glass surface are shown in FIGS. 4A and 4B, respectively. With enhanced spreading, the water droplet penetrates into the recessed areas and spreads within a couple hundred milliseconds on the porous $TiO_2$ surface. As a consequence, the self-similar porous $TiO_2$ surface exhibits a vanishing equilibrium contact angle, whereas the contact angle for water droplets on a glass substrate is approximately 34°. Neither UV irradiation nor visible light was applied for the activation of this extreme, super-hydrophilic behavior.

FIGS. 4A and 4B show dynamics of liquid spreading on self-similar porous $TiO_2$ and untreated surfaces, respectively. Selected images show the spreading of a 0.5 µl water droplet at the early stages after contacting with a self-similar porous $TiO_2$ surface, FIG. 4A and an uncoated glass substrate, FIG. 4B. The static contact angles for the $TiO_2$ surface and the untreated surface are 1° and 34° respectively. For the $TiO_2$ surface, super-hydrophilic behavior (contact angle less than 5°) is established very fast (i.e. during the first 160 ms following the droplet deposition). Here, time zero (t=0) is defined as the frame just before the drop is released on the surface.

Figure 5A:
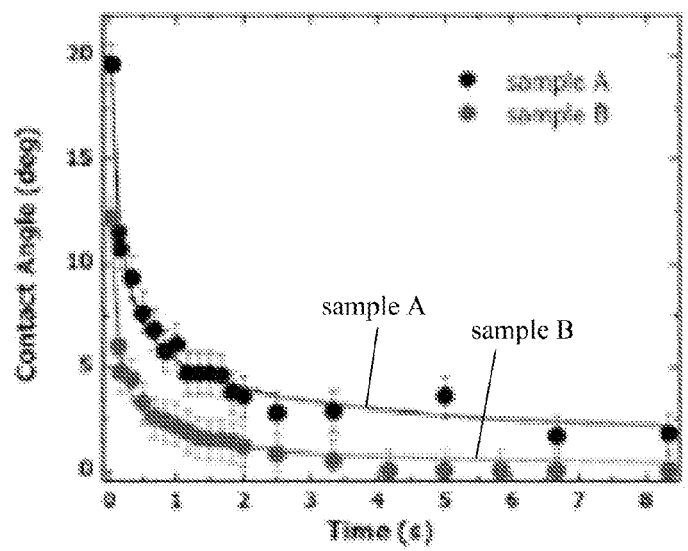
FIGS. 5A, 5B, and 5C provide graphs of data related to liquid spreading on example treated surfaces of the present invention.
Figure 5B:
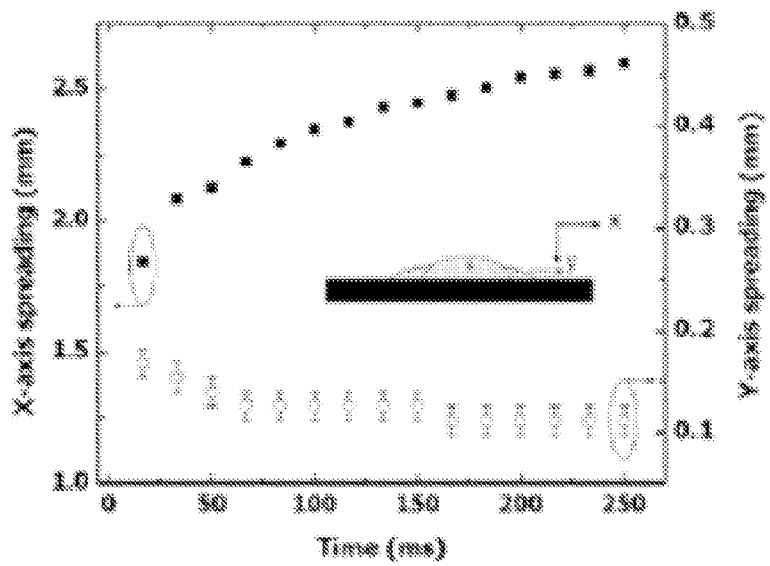

The spreading of a liquid on a solid surface is generally described by the Tanner power law (see, G. McHale et al., *Physical Review Letters* 93 (2004) 036102), which predicts a decrease in the contact angle (θ) with time (t) from droplet deposition, $\theta \propto (t_0+t)^{-n}$, where $t_0$ is a constant. FIG. 5A provides contact angle variation as a function of time for porous $TiO_2$ layers of 200 nm (sample A) and 400 nm (sample B) in thickness, which shows the early stage, time-dependent behavior of the contact angle for water deposited on self-similar porous $TiO_2$ surfaces. The solid lines in FIG. 5A (and FIGS. 5B and 5C) are fittings of the measured data to the power law. The power coefficient, n, increases with the thickness of the self-similar porous $TiO_2$, suggesting that an increase in the thickness of the porous $TiO_2$ layer leads to more efficient liquid spreading. FIG. 5B provides a graph of spreading of a water droplet on a self-similar porous $TiO_2$ surface in the x and y directions (parallel and vertical to the surface. There is a preferential spreading across the surface with an average velocity of ~0.3 cm/s, followed by sinking of the water droplet into the porous layer.

Figure 5C:
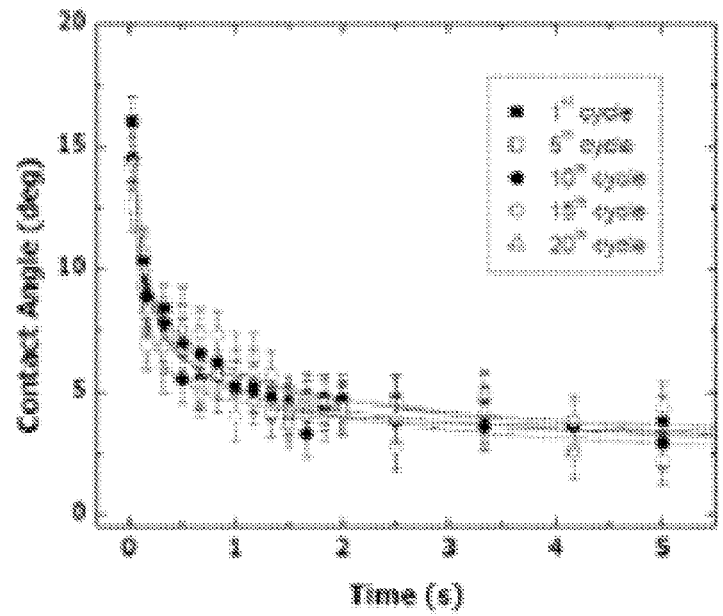

The stability of the self-similar porous $TiO_2$ surface was tested by studying their response against successive wetting-dewetting cycles. The change in the contact angle with time for an increasing number of wetting-dewetting cycles is shown in FIG. 5C. The power law dependence remains essentially unaltered for more than 20 successive wetting cycles. Adsorption of hydrocarbons from the ambient on the $TiO_2$ surface has often been reported to cause increase of the contact angle. The negligible variation in the time-dependent behavior of the vanishing contact angle suggests that the self-similar porous $TiO_2$ surface is resistance against surface contamination.

The observed extreme wetting phenomenon can be interpreted under the framework of Wenzel model (see, R. N. Wenzel, *Industrial and Engineering Chemistry* 28 (1936)

988), according to which surface roughness acts to enhance the wettability of an initially hydrophilic flat surface. In a homogeneous wetting regime where the liquid completely penetrates in the entire surface, the apparent contact angle, $\theta$, is given by, $\cos \theta = r \cos \theta_o$, where r is the ratio of the unfolded surface to the apparent area of contact under the droplet, and $\theta_o$ is the contact angle on a flat surface of the same nature (Young's contact angle). Since r is always greater than unity, the contact angle will decrease for an otherwise hydrophilic) ($\theta_o < 90°$ surface. For self-similar layers such as a self-similar porous $TiO_2$ surface where $\theta_o = 50\text{-}70°$ for flat $TiO_2$ (see, R. Wang et al., *Nature* 388 (1997) 431; and N. Stevens et al., *Langmuir* 19 (2003) 3272), the increase of the overall roughness due to the multiple length scales leads to ever increasing r, thus facilitating a completely wetted surface ($\theta \sim 0°$).

Figure 6A:
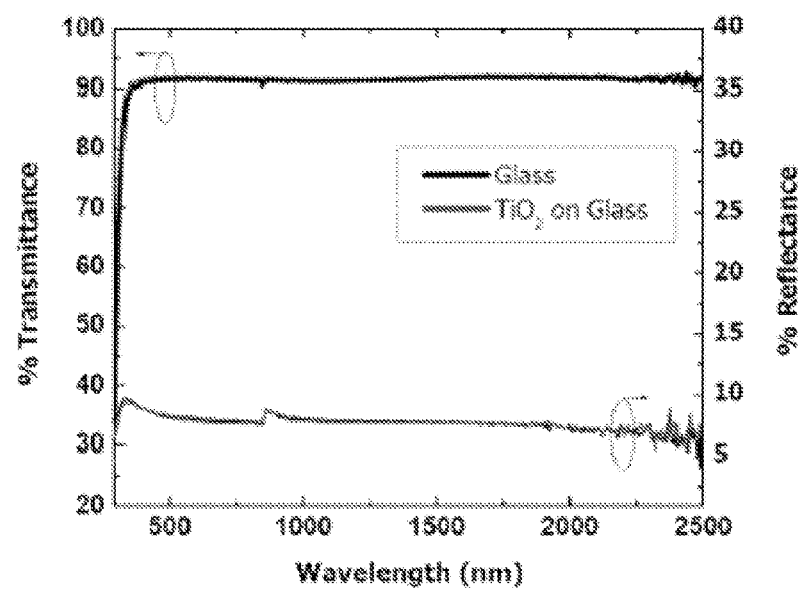
FIGS. 6A and 6B provide optical transmission and reflectance data and spectroscopic ellipsometry data, respectively, for an example treated surface of the present invention.

In addition to the extreme wetting behavior that is favorable for self-cleaning and anti-contamination technologies, the self-similar porous $TiO_2$ surface exhibits optical transparency that makes them ideal for anti-fogging applications. FIG. 6A compares the transmittance and reflectance spectra of a glass substrate coated with a self-similar porous $TiO_2$ surface, to the spectra of an untreated glass substrate. The optical transparency remains essentially unaffected by coating a self-similar porous $TiO_2$ surface. A transmittance over 90% and reflectance between 6 and 8% are obtained in the 300-2500 nm wavelength range for the porous $TiO_2$ coated glass.

Figure 6B:
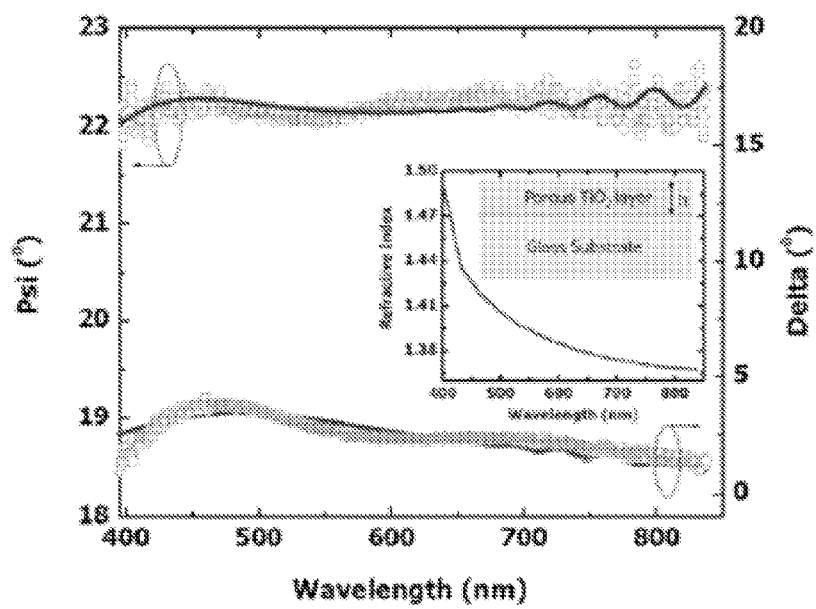

Spectroscopic ellipsometry measurements of a self-similar porous $TiO_2$ coated glass were carried out at an angle of incidence of 70° in the wavelength range of 375-830 nm. The measured $\Delta$ (Delta) and $\Psi$ (Psi) data were fitted using the Bruggeman effective-medium theory, EMT (see, M. Mosaddeq-ur-Rahman et al., *Journal of Applied Physics* 88 (2000) 4634), as shown in FIG. 6B. The effective dielectric function was calculated by taking into account the existence a porous $TiO_2$ layer on a glass substrate, and the porosity was estimated to be ~70%. The EMT model extracts the refractive index of the self-similar porous $TiO_2$ layer as a function of wavelength, shown in the inset of FIG. 6B, where the refractive index has a value $1.40 \pm 0.04$ in the visible wavelength range, which is significantly lower than that (~2.7) of bulk $TiO_2$.

Figure 7:
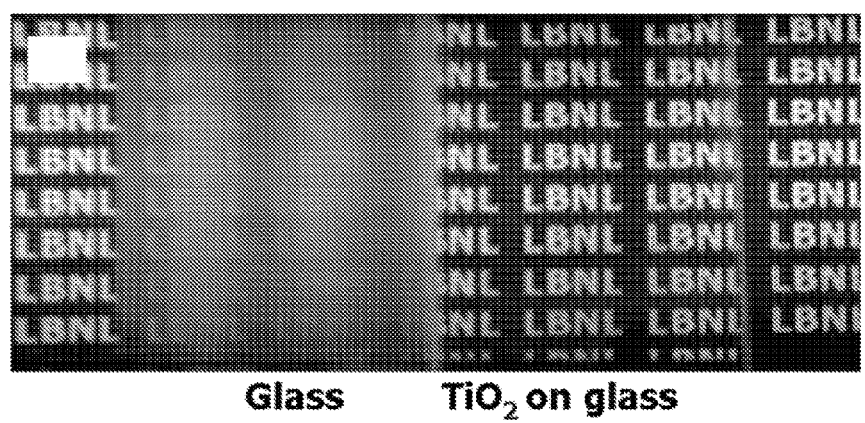
FIG. 7 is a photo that shows an anti-fogging character of an example treated surface of the present invention in comparison to an untreated surface.

To demonstrate the anti-fogging potential enabled by optical transparency combined with the super-hydrophilic nature of the self-similar porous $TiO_2$, an untreated glass slide and a self-similar porous $TiO_2$ coated slide were placed in a freezer at a temperature of approximately $-15°$ C., followed by exposure to the humid air. FIG. 7 shows the anti-fogging property of a glass slide (left) next to the $TiO_2$ coated slide (right). In the latter case, the letter sequence "LBNL" can be clearly resolved as the result of efficient spreading of water droplets to form a uniform film. On the other hand, since the untreated glass surface has poor wettability, moisture condenses on its surface as discrete droplets, causing light scattering and obscuring of the letter sequence under the untreated glass surface. It is also noted that the coated surfaces exhibit the ability to prevent dewetting; a coated glass surface remains fully wet after immersion in water, and this state is maintained until water evaporates.

Experimental:

Anatase $TiO_2$ nanoparticles were synthesized by a sol-gel process. The sol-gel process included forming an aqueous solution that included a Ti precursor and an acid or base. In some examples, the solution also included an alcohol. In some examples, the solution also included a surfactant. In most examples, the resulting solution was stirred for a period of time. The solution was then heated or calcinated to obtain the anatase $TiO_2$ nanoparticles. In a first example, the aqueous solution included titanium propoxide, ethanol, HCl, and F 127 surfactant. Molar concentrations were 1:40:0.5:0.005, but can be 1:(10-500):(0.001-10):(0.00001-10). The solution was stirred for 24 hours and then calcinated in a furnace at 500° C. for 5 hours. In a second example, the aqueous solution included titanium chloride, methanol, NaOH, and Triton X 100 surfactant. Molar concentrations were 1:40:0.2:0.02, but can be 1:(10-500):(0.01-10):(0.0001-10). The solution was stirred for 1 hour and then calcinated in a furnace at 300° C. for 2 hours. In a third example, the aqueous solution included titanium butoxide and HF and $H_2O$. Molar concentrations were 1:10:10, but can be 1:(0.01-10):(1-100). The solution was heated to 180° C. for 24 hours. In a fourth example, the aqueous solution included titanium dioxide fine powder (P25), HCl, and NaCl. Molar concentrations were 1:0.1:0.05, but can be 1:(0.0001-10):(0.0005-1). The solution was stirred for 24 hours and then calcinated in a furnace at 500° C. for 24 hours. Alternatives for the Ti precursor include titanium alkoxide and other suitable Ti precursors. Alternatives for the alcohol include propanol and other suitable alcohols. Alternatives for the acid include nitric acid and other suitable acids. Alternatives for the base include KOH and other suitable bases. Alternatives for the surfactant include P 125 and other suitable surfactants.

Sol-gel synthesized anatase $TiO_2$ nanoparticles dispersed in water were spin-coated on plain soda lime glass slides (Gold Seal) to form porous $TiO_2$ nanoparticle coatings. The resulting films were subsequently calcinated at 500° C. for 5 hours. Surface topographical images of the samples were obtained using a Hitachi (S-4300SE/N) Field Emission SEM, a Veeco Nanoscope III Atomic Force Microscope (AFM) in tapping mode, and a Philips CM200/FEG TEM. X-Ray Diffraction (Siemens D-500 diffractometer) was applied to define the composition and crystallinity of the samples. Statistical analysis of the surface features was performed by using the WSXM software.

The spreading behavior of water droplets in contact with the resulting structures was studied through dynamic contact angle measurements. Water droplets (resistivity of 18.1 M$\Omega$, surface tension of 72.8 mN/m at 20° C.) were gently deposited on the $TiO_2$ surfaces with the use of a microlitter pipette, and a CCD camera lens array system was used in order to record video images of the droplet profiles at a 60 Hz frame rate. The water droplets had a volume of 0.5-3.0 µl (diameter of 0.49-0.89 mm) and contact angle measurements were performed at an environment with relative humidity of 80%. For antifogging experiments, both un-coated and $TiO_2$ coated glass slides were placed in a freezer at a temperature of $-15°$ C. for 1 hour and subsequently exposed to the humid laboratory air.

The transmittance and reflectance of the coated samples were measured using a UV-Vis spectrophotometer (Perkin-Elmer, Lambda 900) equipped with an integrating sphere. A FilmTek 3000 spectroscopic ellipsometer was used for determining the refractive index of the fabricated $TiO_2$ films.

CONCLUSION

Inspired by the hierarchical microstructures existing in a number of biological systems, we self-similar porous $TiO_2$ surfaces that exhibit stable super-hydrophilic wetting behavior without the need of UV light activation were fabricated. In fact, no light was applied in this study, which suggests that there is no need of conventional photocatalytic reactions, nor the requirement of an enhancing agent, to induce super-hydrophilicity in $TiO_2$. The self-similar porous $TiO_2$ surface achieved here also shows favorable optical response with high visible transparency, which, in combination with superhydrophilicity, makes affordable self-cleaning windows and anti-fogging coatings closer to reality.

REFERENCES

1. R. Blossey, *Nature Materials* 2 (2003) 301.
2. A. B. D. Cassie, S. Baxter, *Transactions of the Faraday Society* 40 (1944) 0546.
3. R. N. Wenzel, *Industrial and Engineering Chemistry* 28 (1936) 988.
4. W. Barthlott, C. Neinhuis, *Planta* 202 (1997) 1.
5. L. Zhai, F. C. Cebeci, R. E. Cohen, M. F. Rubner, *Nano Letters* 4 (2004) 1349.
6. X. Chen, S. S. Mao, *Chemical Reviews* 107 (2007) 2891.
7. R. Wang, K. Hashimoto, A. Fujishima, M. Chikuni, E. Kojima, A. Kitamura, M. Shimohigoshi, T. Watanabe, *Nature* 388 (1997) 431.
8. R. Wang, K. Hashimoto, A. Fujishima, M. Chikuni, E. Kojima, A. Kitamura, M. Shimohigoshi, T. Watanabe, *Advanced Materials* 10 (1998) 135.
9. I. P. Parkin, R. G. Palgrave, *Journal of Materials Chemistry* 15 (2005) 1689.
10. C. Pan, S. A. Cheng, H. M. Wei, G. Z. Han, J. Z. Zhang, A. Fujishima, Z. Z. Gu, *Materials Research Bulletin* 42 (2007) 1395.
11. Z. Z. Gu, A. Fujishima, O. Sato, *Applied Physics Letters* 85 (2004) 5067.
12. D. Lee, M. F. Rubner, R. E. Cohen, *Nano Letters* 6 (2006) 2305.
13. W. Y. Gan, S. W. Lam, K. Chiang, R. Amal, H. J. Zhao, M. P. Brungs, *Journal of Materials Chemistry* 17 (2007) 952.
14. S. Song, L. Jing, S. Li, H. Fu, Y. Luan, *Materials Letters* 62 (2008) 3503.
15. C. W. Guo, L. Feng, J. Zhai, G. J. Wang, Y. L. Song, L. Jiang, D. B. Zhu, *Chemphyschem* 5 (2004) 750.
16. G. McHale, N. J. Shirtcliffe, S. Aqil, C. C. Perry, M. I. Newton, *Physical Review Letters* 93 (2004) 036102.
17. N. Stevens, C. I. Priest, R. Sedev, J. Ralston, *Langmuir* 19 (2003) 3272.
18. M. Mosaddeq-ur-Rahman, G. L. Yu, T. Soga, T. Jimbo, H. Ebisu, M. Umeno, *Journal of Applied Physics* 88 (2000) 4634.

It is noted that as used herein and in the appended claims, the singular forms "a", "and", and "the" include plural referents unless the context clearly dictates otherwise.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A superhydrophilic nanostructure comprising:
aggregate clusters, the aggregate clusters having dimensions of about 150 nanometers to 5 microns and comprising porous clusters, the porous clusters having dimensions of about 20 nanometers to 600 nanometers and comprising nanoparticles, and the nanoparticles having dimensions of about 1 nanometer to 100 nanometers.

2. An article of manufacture comprising:
a substrate; and
a superhydrophilic nanostructure disposed on at least a portion of a surface of the substrate, the superhydrophilic nanostructure comprising aggregate clusters, the aggregate clusters having dimensions of about 150 nanometers to 5 microns and comprising porous clusters, the porous clusters having dimensions of about 20 nanometers to 600 nanometers and comprising nanoparticles, and the nanoparticles having dimensions of about 1 nanometer to 100 nanometers.

3. The article of manufacture of claim 2 wherein the nanoparticles comprise titanium dioxide.

4. The article of manufacture of claim 3 wherein the nanoparticles further comprise a dopant.

5. The article of manufacture of claim 4 wherein the dopant is selected from a group consisting of hydrogen, nitrogen, sulphur, carbon, boron, and a combination thereof.

6. The article of manufacture of claim 2 wherein the nanoparticles have dimensions of about 1 nanometer to 50 nanometers.

7. The article of manufacture of claim 2 wherein the porous clusters have dimensions of about 50 nanometers to 600 nanometers.

8. The article of manufacture of claim 2 wherein the aggregate clusters have dimensions of about 200 nanometers to 5 microns.

9. A method of fabricating a superhydrophilic nanostructure comprising:
(a) applying a solution that includes nanoparticles to a substrate; and
(b) heating the substrate to form aggregate clusters, each of the aggregate clusters comprising porous clusters of the nanoparticles, the aggregate clusters having dimensions of about 150 nanometers to 5 microns, the porous clusters having dimensions of about 20 nanometers to 600 nanometers, and the nanoparticles having dimensions of about 1 nanometer to 100 nanometers.

10. The method of claim 9 further comprising forming the nanoparticles.

11. The method of claim 10 wherein forming the nanoparticles comprises forming the nanoparticles using an electrochemistry technique.

12. The method of claim 10 wherein forming the nanoparticles comprises forming the nanoparticles using a sol-gel technique.

13. The method of claim 9 wherein operation (a) comprises spin casting the solution onto the substrate.

14. The superhydrophilic nanostructure of claim 1 wherein the nanoparticles comprise titanium dioxide.

15. The superhydrophilic nanostructure of claim 14 wherein the nanoparticles further comprise a dopant.

16. The superhydrophilic nanostructure of claim 15 wherein the dopant is selected from a group consisting of hydrogen, nitrogen, sulphur, carbon, boron, and a combination thereof.

17. The method of claim 9 wherein the nanoparticles comprise titanium dioxide.

18. The method of claim 17 wherein the nanoparticles further comprise a dopant.

19. The method of claim 18 wherein the dopant is selected from a group consisting of hydrogen, nitrogen, sulphur, carbon, boron, and a combination thereof.

* * * * *